Patented May 9, 1939

2,157,541

UNITED STATES PATENT OFFICE 2,157,541

METHOD OF MANUFACTURING A FERTILIZER BY EMPLOYING CALCIUM CYANAMIDE AS THE RAW MATERIAL

Kuro Hosokawa, Suwa-gun, Nagano-ken, Japan, assignor to Takewo Ozawa, Tokyo, Japan No Drawing. Application March 27, 1937, Serial No. 133,380

1 Claim. (Cl. 71—28)

This invention relates to a method of manufacturing a fertilizer by using calcium cyanamide as the raw material, characterised by suspending calcium cyanamide powder in water and passing carbonic acid gas therethrough so as to precipitate calcium as calcium carbonate as a byproduct and liberate free cyanamide and then filtering the liquor, and after adding sulphuric acid to the filtrate in free solution in such proportion that the molecular ratio of sulphuric acid to cyanamide in amount is 1:4, and converting cyanamide to urea by heating the mixture at a high temperature and then concentrating the same, neutralizing it with the said by-product, calcium carbonate, thereby combining calcium sulphate in nascent state with urea and thus forming urea-calcium-sulphate

[$4CO(NH_2)_2.CaSO_4$]

The object thereof is to considerably increase the yield of non-hygroscopic urea calcium sulphate in manufacturing the same by employing calcium cyanamide and at the same time to prevent the production of dicyandiamide to the utmost and thus manufacture an effective fertilizer.

If calcium cyanamide powder is suspended in water and calcium carbonate is precipitated and removed by passing carbonic acid gas and free cyanamide is hydrolysed, urea will be produced.

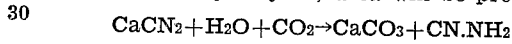
$$CaCN_2 + H_2O + CO_2 \rightarrow CaCO_3 + CN.NH_2$$

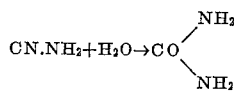
$$CN.NH_2 + H_2O \rightarrow CO\begin{matrix}NH_2\\NH_2\end{matrix}$$

The present invention is characterised by adding a quantity of sulphuric acid to free cyanamide solution which is adjusted from the beginning in such proportion that the molecular ratio of the sulphuric acid and cyanamide in amount is 1:4, heating the mixture at a high temperature and hydrolyzing it, and after concentrating the same, neutralizing it with the calcium carbonate produced as a by-product in the preceding stage of operation and thereby causing calcium sulphate in nascent state to combine with urea.

According to the present invention when the acidity of the solution is increased by the addition of a large quantity of sulphuric acid, there is substantially no dicyandiamide produced but at high temperature, calcium sulphate in a nascent state, which is produced by calcium carbonate acting upon the sulphuric acid, combines with urea and thus can produce urea-calcium-sulphate [$4CO(NH_2)_2.CaSO_4$] easily. In the known method, after producing cyanamide from calcium cyanamide and hydrolysing the same into urea with very dilute sulphuric acid, calcium is added to neutralize the weak acidity of the solution and then precipitated calcium sulphate is filtered out, but in this case a portion of urea combining with the calcium sulphate, is inevitably lost as precipitate, whereas according to the present invention, by employing a large quantity of sulphuric acid from the beginning and thus removing the cause of the production of dicyandiamide, only urea is formed and then the sulphuric acid present in a large quantity is utilized to form calcium sulphate as it is in the same reacting solution, and this calcium sulphate combining in a nascent state with the above urea, so as to produce urea calcium sulphate. Therefore, there is hardly any loss of nitrogen caused by the filtering step, thus increasing the yield of urea calcium sulphate for the manufacture on an industrial scale. The product obtained by the present method being free from dicyandiamide, there is no fear of it damaging vegetables and moreover owing to its non-hygroscopic property, it is easy to handle as compared with simple urea and also is superior to it in fertilizing effect.

Further, in the present invention, as a source of sulphuric acid, it is possible to utilize waste liquor of sulphuric acid containing amino-acids which is the mother liquor remaining after glutamic acid is prepared by hydrolyzing protein with acid. This is not only in accordance with the industrial economy, but also improves the fertilizing effect of the product.

Again, when a saturated solution of potassium nitrate, potassium chloride or potassium sulphate is added, the product of this invention is turned into a syrupy condition by evaporating under reduced pressure and then is mixed further with powdered aluminium phosphate, mono-calcium phosphate or calcium superphosphate and the resulting mixture is suitably broken into pieces after being kneaded and dried. Then, the product will be found to be completely furnished with the essential elements of the fertilizer, namely, with potash and phosphoric acid in addition to the previously mentioned feature.

Example

By suspending 100 grams of calcium cyanamide powder containing 22.0% of nitrogen in 500 cubic centimeters of water and passing carbonic acid gas therethrough for 3 hours, calcium is precipitated wholly as calcium carbonate and free cyanamide is liberated and separated by filtration. Next, to the filtrate is added a quantity of sulphuric acid in such proportion that the molecular ratio of sulphuric acid to cyanamide in amount is 1:4, namely 11.0 cubic centimeters of sulphuric acid (sp. gr. 1.85) which is equivalent to 19.5 grams of pure sulphuric acid and subsequently the mixture is heated at 75° C. and converted to urea by hydrolysis, while stirring it. Then, it is concentrated so that the entire quantity will become 300 cubic centimeters. If this is maintained at a temperature 70-80° C. and sulphuric acid is neutralized with the previously separated by-product, calcium carbonate, it will form calcium sulphate, at the same time generating sufficient heat of reaction to combine such calcium sulphate in nascent state with urea, and after the lapse of 1-2 hours the reaction will be complete so as to produce urea-calcium-sulphate as a completely finished product, which is then dried by evaporation under reduced pressure.

It may sometimes be necessary, when mixing 60 grams of aluminium phosphate powder (containing anhydrous phosphoric acid 20% and water 20%) with the viscous matter obtained by adding 20 grams of a saturated solution of potassium chloride to said reaction product before being concentrated by vaporization, to heat the mixture at 60-90° C. for 3 hours under reduced pressure, after which it is kneaded and dried and then broken into pieces, whereupon a final product will be produced containing 13.06% of N as urea-calcium-sulphate, 7.36% of $K_2O$ (water-soluble potash) and 1.12% of $P_2O_5$ (citric acid-soluble).

Having now fully described my invention, I claim:

Method of manufacturing a fertilizer by using calcium cyanamide as the raw material, which consists in suspending calcium cyanamide powder in water to form a solution and passing carbonic acid gas therethrough to precipitate calcium carbonate as a by-product and liberate free cyanamide, separating the calcium carbonate precipitated from the solution, adding an amount of sulphuric acid to the cyanamide solution from which calcium carbonate has thus been precipitated, in such proportion that the molecular ratio of sulphuric acid to cyanamide in amount is 1:4 converting the cyanamide produced to urea by heating and hydrolysing, concentrating the same, and then neutralizing it with said by-product, calcium carbonate to liberate calcium sulphate and thereby causing the nascent calcium sulphate liberated to combine with previously formed urea in heated condition in order to produce urea-calcium-sulphate.

KURO HOSOKAWA.